United States Patent
Kim et al.

(10) Patent No.: US 8,898,341 B2
(45) Date of Patent: Nov. 25, 2014

(54) METHOD OF ALLOCATING UNIQUE IDENTIFIER AND BATTERY MANAGEMENT SYSTEM USING THE SAME

(71) Applicant: LG Chem, Ltd., Seoul (KR)

(72) Inventors: Jihun Kim, Daejeon (KR); Jaedong Park, Daejeon (KR); Jongmin Park, Daejeon (KR); Hyunjin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/088,191

(22) Filed: Nov. 22, 2013

(65) Prior Publication Data

US 2014/0115191 A1   Apr. 24, 2014

Related U.S. Application Data

(63) Continuation of application No. PCT/KR2012/008624, filed on Oct. 19, 2012.

(51) Int. Cl.
```
G06F 3/00      (2006.01)
G06F 1/00      (2006.01)
G06F 13/362    (2006.01)
```
(52) U.S. Cl.
CPC .................................. G06F 13/362 (2013.01)
USPC ............................................. 710/4; 713/340

(58) Field of Classification Search
None
See application file for complete search history.

(56) References Cited

U.S. PATENT DOCUMENTS

| | | | | |
|---|---|---|---|---|
| 5,974,559 | A * | 10/1999 | Bannai | 713/330 |
| 6,122,746 | A * | 9/2000 | Nouri et al. | 713/310 |
| 6,484,215 | B1 * | 11/2002 | Gibart et al. | 710/9 |
| 7,171,505 | B2 * | 1/2007 | Kuhlmann et al. | 710/305 |
| 2003/0007510 | A1 | 1/2003 | Yeo et al. | |
| 2006/0057963 | A1 | 3/2006 | Lee | |
| 2010/0019732 | A1 | 1/2010 | Utsumi et al. | |
| 2012/0268069 | A1 | 10/2012 | Park et al. | |

FOREIGN PATENT DOCUMENTS

| | | | |
|---|---|---|---|
| JP | 2002-110259 A | 4/2002 | |
| KR | 2003-0004945 A | 1/2003 | |
| KR | 10-2006-0024947 A | 3/2006 | |
| KR | 10-2009-0069189 A | 6/2009 | |
| KR | 10-2012-0037163 A | 4/2012 | |

* cited by examiner

*Primary Examiner* — Hyun Nam
(74) *Attorney, Agent, or Firm* — Birch, Stewart, Kolasch & Birch, LLP (57) ABSTRACT

Disclosed are a method of allocating unique identifiers to slave battery managers for managing battery modules by a master battery manager and a battery management system using the same, and the method includes making a request for allocation information to the slave battery managers; receiving the allocation information from the slave battery managers; and allocating the unique identifiers to the slave battery managers based on the allocation information, wherein the allocation information contains an MAC address of a device performing a calibration between the slave battery manager and the battery module and time information on a time when the calibration is performed. According to the present invention, it is possible to efficiently control and manage a plurality of battery modules by allocating unique identifiers by using allocation information set to each of the plurality of battery modules.

18 Claims, 5 Drawing Sheets

| INFORMATION | CONFIGURATION | SIZE |
|---|---|---|
| MAC ADDRESS | AA : BB : CC : DD : EE : FF | 48bit |
| DAY/TIME | YEAR/MONTH/DAY HOUR:MINUTE:SECOND<br>( 7/ 4 / 5    5 : 6 : 6 bit) | 33bit |

FIG.5

METHOD OF ALLOCATING UNIQUE IDENTIFIER AND BATTERY MANAGEMENT SYSTEM USING THE SAME

CROSS REFERENCE TO RELATED APPLICATIONS

This application is a Bypass Continuation of PCT International Application No. PCT/KR2012/008624 filed on Oct. 19, 2012. The entire contents of the above application is hereby incorporated by reference.

TECHNICAL FIELD

The present invention relates to a battery management system, and more particularly, to a method of allocating a unique identifier and a battery management system using the same.

BACKGROUND ART

In general, a power storage field uses a packaged structure in which a plurality of battery packs is connected to each other in series and/or in parallel to obtain high power and/or high capacity electric energy.

In such a structure in which the plurality of battery packs is packaged, it is possible to vary the number of battery packs but it is difficult to control and manage each battery pack according to the increase in the number of battery packs. Accordingly, most battery management systems have a hierarchical structure in which a particular battery management system is set as a master and the remaining battery management systems are set as slaves. That is, each battery pack connected to each slave battery management system can be controlled and managed by controlling a plurality of slave battery management systems by a master battery management system.

At this time, in order to allow the master battery management system to more efficiently control each of the slave battery management systems, a technique for recognizing and identifying each slave battery management system is required. Further, a technique for uniquely identifying each slave battery management system even when the number of battery packs increases is required.

DETAILED DESCRIPTION OF THE INVENTION

Technical Problem

In order to efficiently control and manage a plurality of battery modules, the present invention provides a method of allocating a unique identifier for each of a plurality of slave battery management systems connected to each of the plurality of battery modules by using allocation information set to each of the plurality of battery modules and a battery management system using the same.

Technical Solution

An exemplary embodiment of the present invention provides a method of allocating unique identifiers to slave battery managers for managing battery modules by a master battery manager, the method including: making a request for allocation information to the slave battery managers; receiving the allocation information from the slave battery managers; and allocating the unique identifiers to the slave battery managers based on the allocation information, wherein the allocation information contains an MAC address of a device performing a calibration between the slave battery manager and the battery module and time information on a time when the calibration is performed.

The allocation information may be divided into a plurality of data blocks, and the data blocks may be sequentially received.

The master battery manager may be connected to the plurality of slave battery managers.

The allocating of the unique identifiers may include: determining the number of plurality of slave battery managers connected to the master battery manager based on the allocation information; and allocating the unique identifiers which do not overlap each other to the plurality of slave battery managers, respectively.

A bit number of the unique identifier may be smaller than a bit number of the allocation information, and a bit number of each of the plurality of data blocks may be equal to or smaller than 29 bits.

The master battery manager and the slave battery manager may perform CAN communication, and the slave battery manager and the device performing the calibration may perform RS 232 communication.

Another exemplary embodiment of the present invention provides a battery management system including: slave battery managers configured to manage battery modules and having allocation information set thereto; and a master battery manager configured to allocate unique identifiers for the slave battery managers based on the allocation information and manage the battery modules by being connected to the slave battery managers to control the slave battery managers, wherein the allocation information contains an MAC address of a device performing a calibration between the slave battery manager and the battery module and time information on a time when the calibration is performed.

The master battery manager may include: a master communication unit configured to perform communication with the slave battery managers, make a request for the allocation information to the slave battery managers, and receive the allocation information; and an ID allocator configured to allocate the unique identifiers for the slave battery managers based on the allocation information.

The slave battery manager may include: a slave communication unit configured to perform communication with the master battery manager and transmit the allocation information by a request of the master battery manager; and a memory unit configured to store the identifiers allocated by the master battery manager.

The slave communication unit may divide the allocation information into a plurality of data blocks and sequentially transmit the data blocks.

The master battery manager may be connected to the plurality of slave battery managers.

The ID allocator may determine the number of plurality of slave battery managers connected to the master battery manager and allocate the unique identifiers which do not overlap each other to the plurality of slave battery managers, respectively.

A bit number of the unique identifier may be smaller than a bit number of the allocation information, and a bit number of each of the plurality of data blocks may be equal to or smaller than 29 bits.

The master battery manager and the slave battery manager may perform CAN communication, the slave battery manager and the device performing the calibration may perform RS 232 communication.

Advantageous Effects

Accordingly to the present invention, it is possible to allocate a unique identifier for each of a plurality of slave battery management systems connected to each of a plurality of battery modules by using allocation information set to each of the plurality of battery modules and accordingly to efficiently control and manage the plurality of battery modules.

BEST MODE

Hereinafter, exemplary embodiments of the present invention will be described in detail with reference to the accompanying drawings so that those skilled in the art can easily implement the exemplary embodiments of the present invention. Further, the present invention is not limited to the exemplary embodiments described below and may be applied in various types without departing from the scope of the technical idea of the present invention.

Components described in this specification may include another component other than the components described below as necessary, and a detailed description of a part, which is not directly related to the present invention, or overlapping contents will be omitted. Further, an arrangement of each component described in this specification can be adjusted as necessary, and one component may be included in another component or may be divided into two or more components.

Figure 1:
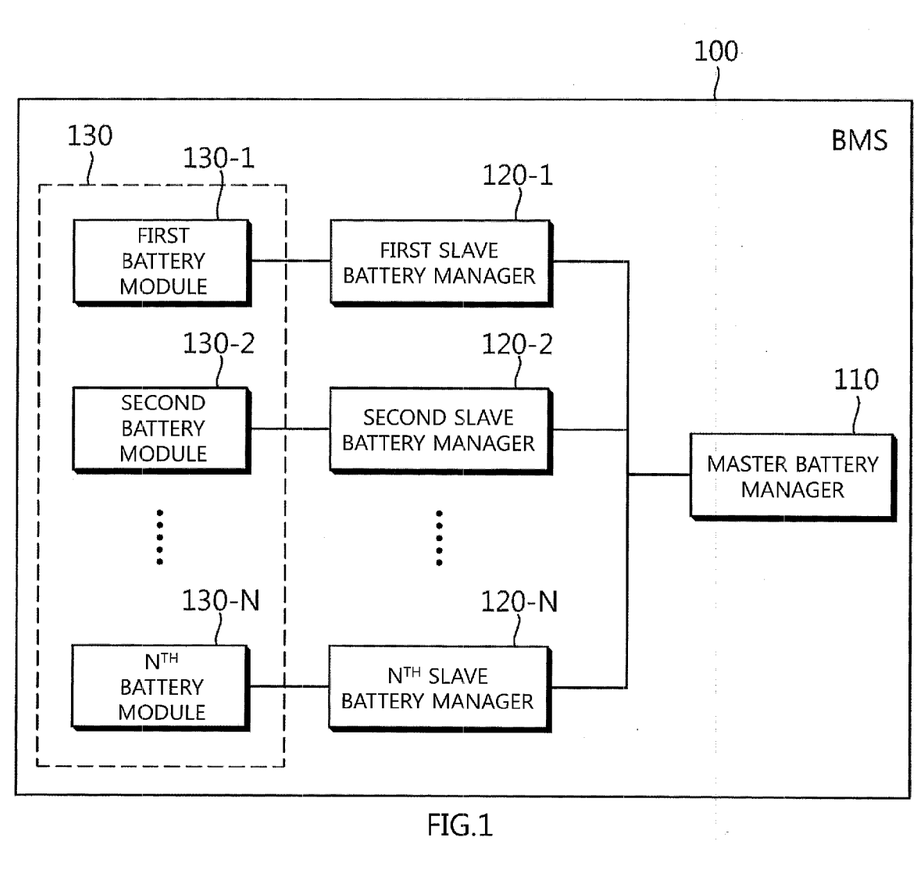
FIG. 1 is a block diagram schematically illustrating a configuration of a battery management system (BMS) 100 according to an exemplary embodiment of the present invention.

FIG. 1 is a block diagram schematically illustrating a configuration of a battery management system (BMS) 100 according to an exemplary embodiment of the present invention.

Referring to FIG. 1, the BMS 100 includes a master battery manager 110, a plurality of slave battery managers 120_1 to 120_N, and a battery pack 130 including a plurality of battery modules 130_1 to 130_N.

Each of the plurality of battery modules 130_1 to 130_N may includes a plurality of battery cells, and the plurality of battery cells may be connected in series and/or in parallel. Further, the plurality of battery modules 130_1 to 130_N may be connected in series and/or in parallel to form the high power and/or high capacity battery pack 130.

Each of the slave battery managers 120_1 to 120_N is connected to each of the battery modules 130_1 to 130_N to control and manage one of the battery modules 130_1 to 130_N connected to itself.

In order to control and manage the battery pack 130, the master battery manager 110 may be connected to each of the slave battery managers 120_1 to 120_N to control and manage each of the battery modules 130_1 to 130_N through the connected slave battery manager.

To this end, in order to identify respective battery modules 130 to 130_N, the master battery manager 110 may allocate a unique identifier (ID) to each of the slave battery managers 120_1 to 120_N connected to the battery modules 130 to 130_N.

For example, the master battery manager 110 is connected to the plurality of slave battery managers 120_1 to 120_N to make a request for allocation information for allocating the unique identifier to the plurality of slave battery managers 120_1 to 120_N and receive the allocation information from the plurality of slave battery managers 120_1 to 120_N through a communication method such as a controller area network (CAN) and the like. Here, the allocation information contains a media access control (MAC) address of a device performing a calibration between each of the slave battery managers 120_1 to 120_N and each of the battery modules 130_1 to 130_N connected to each of the slave battery managers 120_1 to 120_N and information on a time when the calibration is performed. Meanwhile, each of the plurality of slave battery managers 120_1 to 120_N transmits the allocation information set to each of the slave battery managers 120_1 to 120_N, that is, the MAC address and the calibration time information to the master battery manager 110, and then the master battery manager 110 may allocate a unique identifier for each of the slave battery managers 120_1 to 120_N based on the received allocation information.

Hereinafter, a process of setting the allocation information to the slave battery managers 120_1 to 120_N will be described in detail with reference to FIG. 2.

Figure 2:
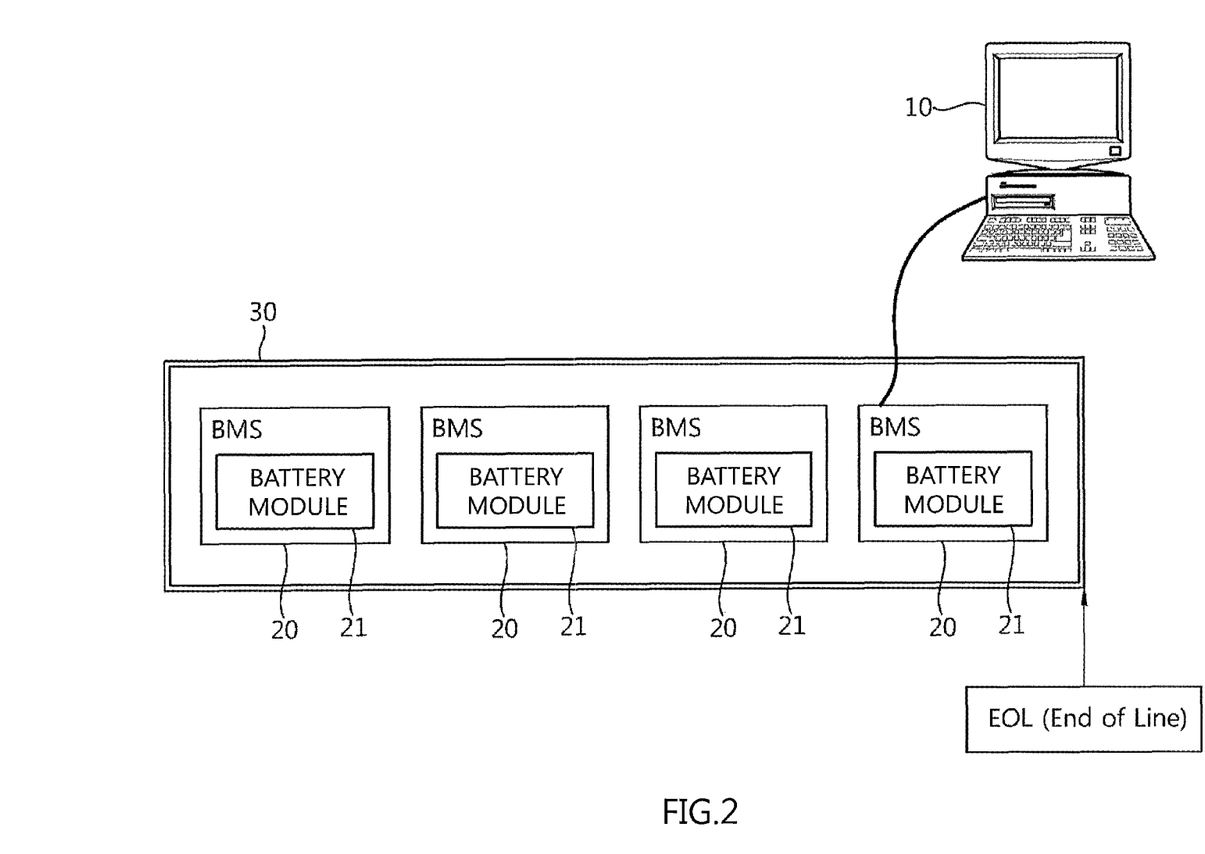
FIG. 2 is a view schematically describing a process of setting allocation information to a slave battery manager according to an exemplary embodiment of the present invention.

Referring to FIG. 2, a battery module 21 and a BMS 20 including the battery module 21 according to the present invention perform the calibration in a final step of a manufacturing process. Here, the calibration refers to correcting information on a battery actually produced to have efficiency closest to efficiency when the battery is designed.

At this time, the BMS 20 is connected to a calibration device 10 to calibrate the battery module 21. For example, the BMS 20 and the calibration device 10 can perform the calibration through communication such as RS 232 and the like.

Further, the BMS 20 receives allocation information from the calibration device 10. That is, the BMS 20 may receive an MAC address of the calibration device 10 and information on a time when the calibration is performed. The allocation information may be stored in a memory, for example, an electrically erasable program ROM (EEPROM) within the BMS 20 and the like.

Here, the MAC address is a physical address of a network card used for communication between devices, and has a unique value. Further, the information on the time when the calibration is performed may also be unique information for the BMS 20 having the same MAC address. For example, a plurality of battery modules 21 moving along a conveyor belt 30 is connected to the calibration device 10 to perform the calibration. At this time, after the calibration device 10 and one battery module 21 are connected to perform the calibration, the calibration device 10 and another battery module 21 are connected to perform the calibration. That is, since the calibration is sequentially performed in the same calibration device 10, each BMS 20 sets different time information.

As described above, each BMS 20 sets unique allocation information, that is, the MAC address and the time information on the time when the calibration is performed, and by using the allocation information, it is possible to allocate unique identifiers, which do not overlap each other, regardless of the number of battery modules 21 by recognizing each battery module 21. Accordingly, it is possible to more easily identify each battery module 21, and efficiently control and continuously manage each battery module 21.

Figure 3:
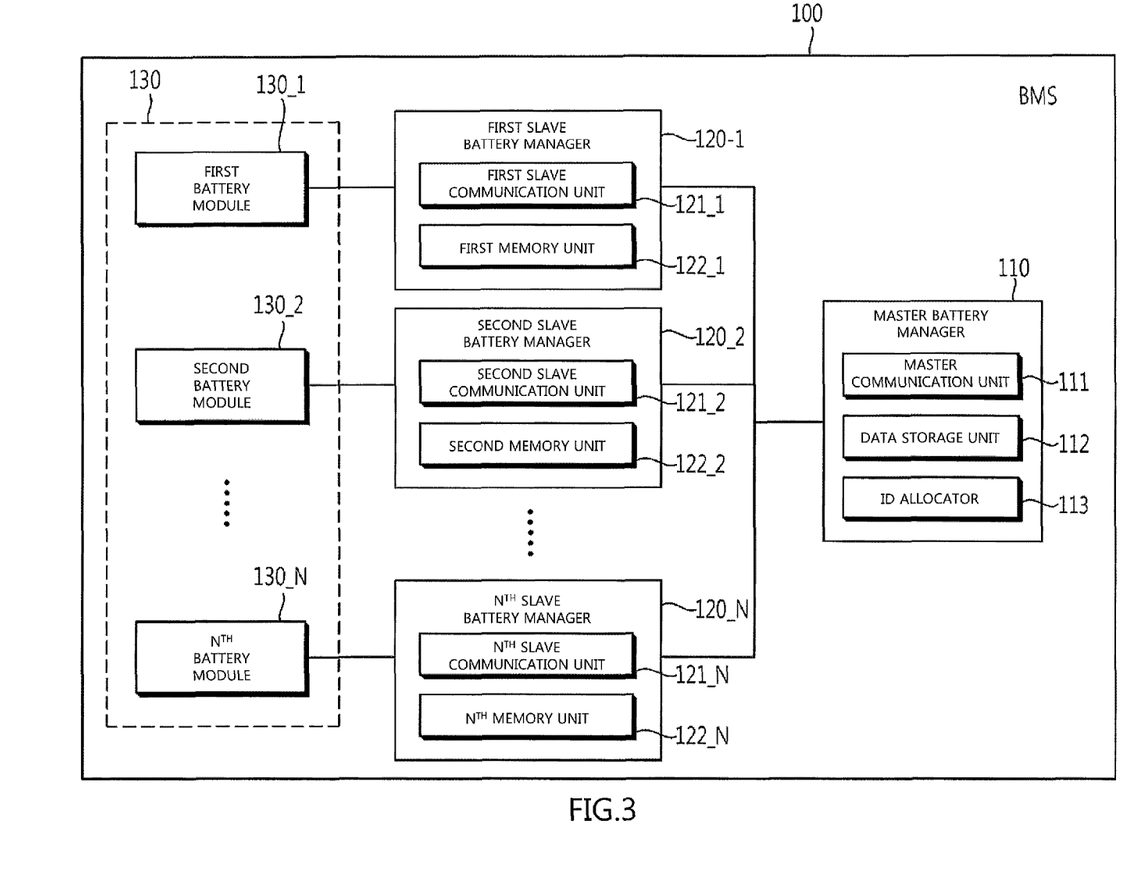
FIG. 3 is a block diagram illustrating in detail a master battery manager and a slave battery manager according to an exemplary embodiment of the present invention.

FIG. 3 is a detailed block diagram of the master battery manager and the slave battery manager according to an exemplary embodiment of the present invention.

Referring to FIG. 3, a master battery manager 110 includes a master communication unit 111 and an ID allocator 113.

The master communication unit 111 performs communication with each of the slave battery managers 120_1 to 120_N. For example, the master communication unit 111 may make a request for allocation information for allocating a unique identifier to each of the slave battery managers 120_1 to 120_N and receive the allocation information from each of the slave battery managers 120_1 to 120_N by using a communication method such as CAN and the like. That is, the master communication unit 111 makes a request for an MAC address and time information on a time when the calibration is performed to each of the slave battery managers 120_1 to 120_N and receives the MAC address and the time information.

At this time, according to a communication method, the master communication unit 111 may divide the allocation information from each of the slave battery managers 120_1 to 120_N into a plurality of data blocks to sequentially receive the data blocks. For example, when CAN communication in an expansion mode is used, since an identifier field of a CAN message is set to have 29 bits, the master communication unit 111 may receive data blocks having a maximum of 29 bits from the respective slave battery managers 120_1 to 120_N at a time. The master communication unit 111 sequentially receives a plurality of data blocks and receives the allocation information set to each of the slave battery managers 120_1 to 120_N.

Further, the master communication unit 111 transmits the unique identifier allocated to each of the slave battery managers 120_1 to 120_N by the ID allocator 113 described below to each of the slave battery managers 120_1 to 120_N.

The ID allocator 113 allocates the unique identifier for each of the slave battery managers 120_1 to 120_N based on the allocation information of each of the slave battery managers 120_1 to 120_N. That is, the ID allocator 113 may determine the number of plurality of slave battery managers 120_1 to 120_N connected to the master battery manager 110 based on the allocation information to allocate unique identifiers which do not overlap each other to the slave battery managers 120_1 to 120_N. At this time, the unique identifier may be allocated to have the bit number smaller than the bit number of the allocation information.

The master battery manager 110 may further include a data storage unit 112.

The data storage unit 112 stores the allocation information received from the each of the slave battery managers 120_1 to 120_N by a request of the master communication unit 111. For example, the data storage unit 112 may store the allocation information such that the MAC address of each of the slave battery managers 120_1 to 120_N corresponds to the information on the time when the calibration is performed. Accordingly, the aforementioned ID allocator 113 may determine the number of plurality of slave battery managers 120_1 to 120_N through the allocation information stored in the data storage unit 112.

Meanwhile, the plurality of slave battery managers 120_1 to 120_N is configured by the first slave battery manager 120_1 to the $N^{th}$ slave battery manager 120_N, and includes slave communication units 121_1 to 121_N and memory units 122_1 to 122_N, respectively. Since configurations and operations of the first slave battery manager 120_1 to the $N^{th}$ slave battery manager 120_N are equal, only the configuration of the first slave battery manager 120_1 will be described hereinafter in detail.

The slave communication unit 121_1 performs communication with the master communication unit 111. For example, the slave communication unit 121_1 may transmit allocation information requested by the master communication unit 111 for an identifier allocation by using a communication method such as CAN and the like. At this time, as described above, when the CAN communication in the expansion mode is used, the slave communication unit 121_1 may divide allocation information into data blocks having the number of bits equal to or smaller than 29 bits and sequentially transmit the data blocks to the master communication unit 111.

Further, the slave communication unit 121_1 receives unique identifier information allocated from the master communication unit 111 to the first slave battery manager 120_1.

The memory unit 122_1 stores the unique identifier of the first slave battery manager 120_1 received from the slave communication unit 121_1.

Hereinafter, a method in which the master battery manager 110 allocates a unique identifier to each of the plurality of slave battery managers 120_1 to 120_N by using the battery management system 100 described in FIGS. 1 to 3 will be described.

Figure 4:
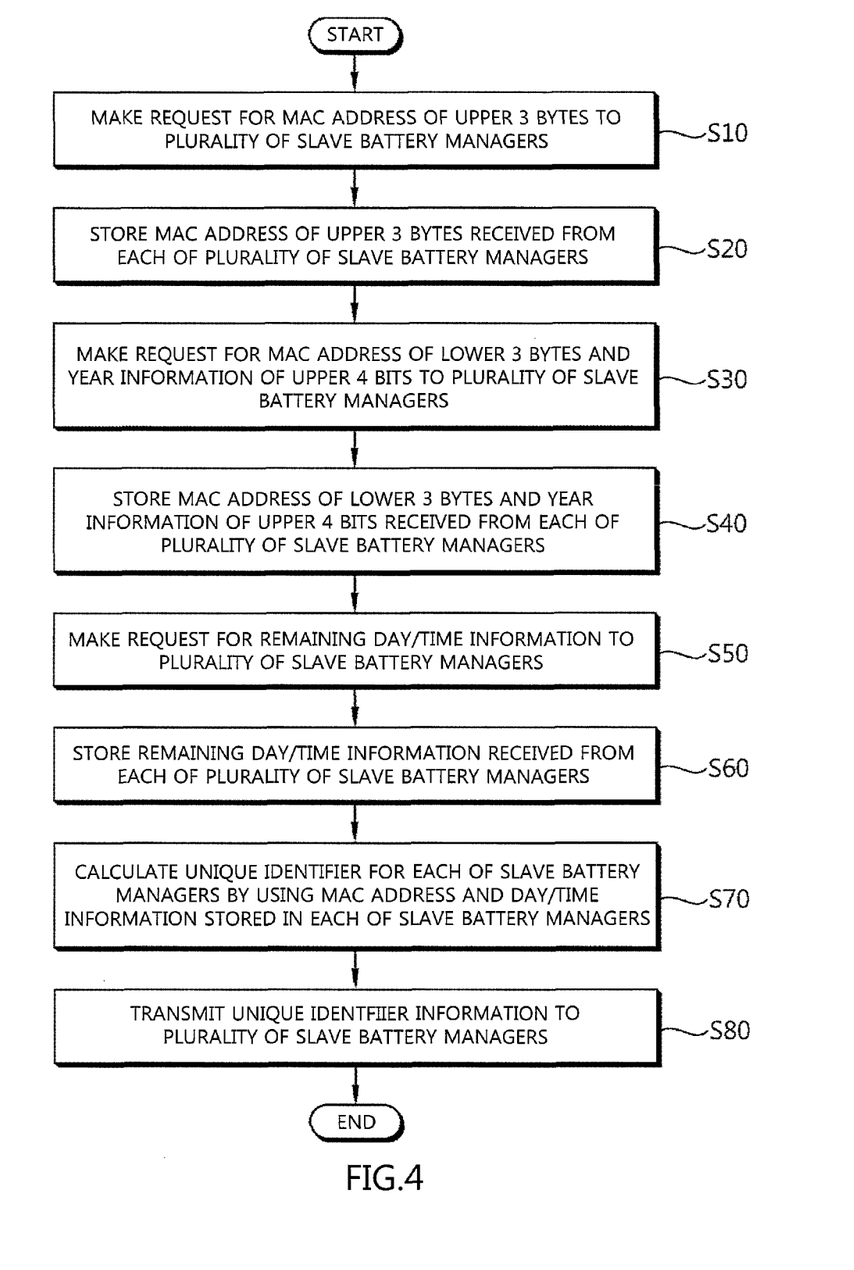
FIG. 4 is a flowchart illustrating a method in which a master battery manager allocates a unique identifier to each of a plurality of slave battery managers according to an exemplary embodiment of the present invention.

FIG. 4 is a flowchart illustrating a method in which the master battery manager allocates the unique identifier to each of the plurality of slave battery managers according to an exemplary embodiment of the present invention.

Here, it will be described as an example that the master battery manager and the plurality of slave battery managers use a CAN communication method. At this time, the CAN communication is in an expansion mode, and identifier data which can be transmitted/received at a time through the CAN communication consists of 29 bits.

Figure 5:
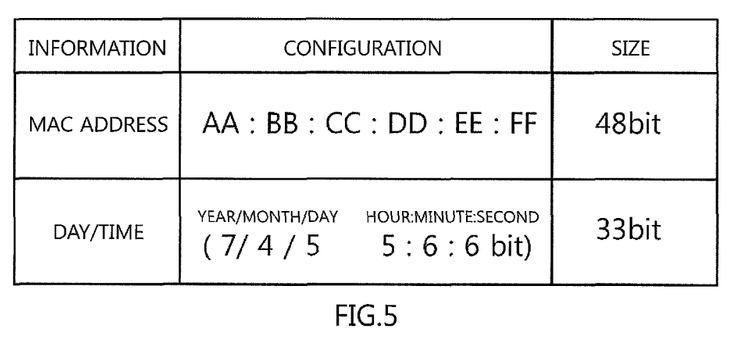
FIG. 5 is a view illustrating configurations and sizes of an MAC address and time information on a time when a calibration is performed according to an exemplary embodiment of the present invention.

Referring to FIG. 4, the master battery manager makes a request for an MAC address of upper 3 bytes (24 bits) to each of the plurality of slave battery managers (step S10). Here, FIG. 5 illustrates the MAC address and the time information on the time when the calibration is performed. The MAC address consists of a total of 48 bits and the time information on the time when the calibration is performed consists of a total 33 bits in a form of year/month/day hour:minute:second. Accordingly, the master battery manager divides the allocation information into data blocks having the number of bits equal to or smaller than 29 bits, and then sequentially makes a request for and receives the allocation information.

Next, the master battery manager receives the MAC address of upper 3 bytes (24 bits) from each of the plurality of slave battery managers and stores the received MAC address (step S20). For example, when the number of received different MAC addresses of upper 3 bytes (24 bits) is two, the MAC addresses may be stored as shown in Table 1 below.

TABLE 1

| MAC address of upper 3 bytes (24 bits) |
|---|
| AA:BB:CC |
| AA:BB:DD |

Next, the master battery manager makes a request for an MAC address of lower 3 bytes (24 bits) and year information of upper 4 bits to each of the plurality of slave battery managers (step S30), and receives the MAC address of lower 3 bytes (24 bits) and the year information of upper 4 bits from each of the plurality of slave battery managers and stores the received MAC address and year information (step S40).

Here, for each of the received MAC addresses of upper 3 bytes (24 bits), the master battery manager makes a request for an MAC address of lower 3 bytes (24 bits) and year information of upper 4 bits to the slave battery manager corresponding to the MAC address and receives the information.

For example, each of the MAC address of lower 3 bytes (24 bits) and the year information of upper 4 bits received according to each of the MAC addresses of upper 3 bytes (24 bits) may be stored as shown in Table 2 below.

TABLE 2

| MAC address of upper 3 bytes (24 bits) | MAC address of lower 3 bytes (24 bits) and year information of upper 4 bits |
|---|---|
| AA:BB:CC | DD:EE:FF 2010 |
|  | DD:EE:FF 2011 |
| AA:BB:DD | DD:EE:FF 2009 |
|  | DD:EE:AA 2011 |

Next, the master battery manager makes a request for the remaining day/time information (29 bits) to each of the plurality of slave battery managers (step S50), and receives the remaining day/time information (29 bits) from each of the plurality of slave battery managers and stores the remaining day/time information (step S60).

Here, for each of the MAC addresses of lower 3 bytes (24 bits) and the year information of upper 4 bits, the master battery manager makes a request for the remaining day/time information (29 bits) to the slave battery manager corresponding to the MAC address and the year information and receives the information.

For example, each of the remaining day/time information (29 bits) received according to each of the MAC addresses of lower 3 bytes (24 bits) and the year information of upper 4 bits may be stored as shown in Table 3 below.

TABLE 3

| MAC address of upper 3 bytes (24 bits) | MAC address of lower 3 bytes (24 bits) and year information of upper 4 bits | Remaining day/time information (29 bits) |
|---|---|---|
| AA:BB:CC | DD:EE:FF 2010 | 2010/09/07 10:44:32 |
|  |  | 2010/09/07/10:44:40 |
|  | DD:EE:FF 2011 | 2011/02/12 15:23:47 |
|  |  | 2011/02/13 15:25:23 |
| AA:BB:DD | DD:EE:FF 2009 | 2009/12/13 10:44:32 |
|  |  | 2009/12/13 15:23:47 |
|  | DD:EE:AA 2011 | 2011/03/08 15:25:23 |

Next, the master battery manager calculates a unique identifier for each of the slave battery managers by using the MAC address and the time information on the time when the calibration is performed, which are received from each of the plurality of slave battery managers and stored (step S70). That is, the master battery manager may determine the number of plurality of slave battery managers connected to the master battery manager based on the MAC address and the time information on the time when the calibration is performed and allocate inherent identifiers which do not overlap to the slave battery managers.

Referring to the allocation information shown in Table 3, it can be seen that the master battery manager is connected to seven slave battery managers, and the master battery manager may allocate the unique identifier to each of the slave battery managers connected to the master battery manager by using the information. For example, the master battery manager may sequentially allocate increasing numbers to the respective slave battery managers in an order shown in Table 3. Here, the unique identifier allocated to each of the slave battery managers may be allocated the number of bits smaller than the number of bits of the allocation information. Accordingly, the master battery manager easily identifies each of the slave battery managers by using the unique identifiers, so that it is possible to more efficiently control and manage each battery module connected to each of the slave battery managers.

Next, the master battery manager transmits the unique identifier allocated to each of the plurality of slave battery managers (step S80).

The steps of the flowchart according to the present invention may be generated according to a different order from that of the above-described steps or may be generated at the same time. Further, it will be understood by those skilled in the art that the steps in the flowchart are not exclusive but another step may be included in the flowchart or one or more steps in the flowchart may be omitted without influencing the scope of the present invention.

The invention claimed is:

1. A method of allocating unique identifiers to slave battery managers for managing battery modules by a master battery manager, the method comprising:
    making a request for allocation information to the slave battery managers;
    receiving the allocation information from the slave battery managers; and
    allocating the unique identifiers to the slave battery managers based on the allocation information,
    wherein the allocation information contains an MAC address of a device performing a calibration between the slave battery manager and the battery module and time information on a time when the calibration is performed.

2. The method according to claim 1, wherein the allocation information is divided into a plurality of data blocks, and the data blocks are sequentially received.

3. The method according to claim 1, wherein the master battery manager is connected to the plurality of slave battery managers.

4. The method according to claim 3, wherein the allocating of the unique identifiers comprises:
    determining the number of plurality of slave battery managers connected to the master battery manager based on the allocation information; and
    allocating the unique identifiers which do not overlap each other to the plurality of slave battery managers, respectively.

5. The method according to claim 1, wherein a bit number of the unique identifier is smaller than a bit number of the allocation information.

6. The method according to claim 2, wherein a bit number of each of the plurality of data blocks is equal to or smaller than 29 bits.

7. The method according to claim 1, wherein the master battery manager and the slave battery manager perform CAN communication.

8. The method according to claim 1, wherein the slave battery manager and the device performing the calibration perform RS 232 communication.

9. A battery management system comprising:
slave battery managers configured to manage battery modules and having allocation information set thereto; and
a master battery manager configured to allocate unique identifiers for the slave battery managers based on the allocation information and manage the battery modules by being connected to the slave battery managers to control the slave battery managers,
wherein the allocation information contains an MAC address of a device performing a calibration between the slave battery manager and the battery module and time information on a time when the calibration is performed.

10. The battery management system according to claim 9, wherein the master battery manager comprises:
a master communication unit configured to perform communication with the slave battery managers, make a request for the allocation information to the slave battery managers, and receive the allocation information; and
an ID allocator configured to allocate the unique identifiers for the slave battery managers based on the allocation information.

11. The battery management system according to claim 9, wherein the slave battery manager comprises:
a slave communication unit configured to perform communication with the master battery manager and transmit the allocation information by a request of the master battery manager; and
a memory unit configured to store the identifiers allocated by the master battery manager.

12. The battery management system according to claim 11, wherein the slave communication unit divides the allocation information into a plurality of data blocks and sequentially transmits the data blocks.

13. The battery management system according to claim 10, wherein the master battery manager is connected to the plurality of slave battery managers.

14. The battery management system according to claim 13, wherein the ID allocator determines the number of plurality of slave battery managers connected to the master battery manager and allocates the unique identifiers which do not overlap each other to the plurality of slave battery managers, respectively.

15. The battery management system according to claim 10, wherein a bit number of the unique identifier is smaller than a bit number of the allocation information.

16. The battery management system according to claim 12, wherein a bit number of each of the plurality of data blocks is equal to or smaller than 29 bits.

17. The battery management system according to claim 9, wherein the master battery manager and the slave battery manager perform CAN communication.

18. The battery management system according to claim 9, wherein the slave battery manager and the device performing the calibration perform RS 232 communication.

* * * * *